July 8, 1952  F. DIEKMANN  2,602,254
PICTURE FRAME

Filed Oct. 2, 1947  2 SHEETS—SHEET 1

Inventor:
Frans Diekmann
By Brown, Jackson, Boettcher & Dienner
Atty's.

July 8, 1952 F. DIEKMANN 2,602,254
PICTURE FRAME
Filed Oct. 2, 1947 2 SHEETS—SHEET 2

Inventor:
Frans Diekmann
By Brown, Jackson, Boettcher & Dienner
Attys.

Patented July 8, 1952

2,602,254

UNITED STATES PATENT OFFICE 2,602,254

PICTURE FRAME

Frans Diekmann, Diepenveen, Netherlands

Application October 2, 1947, Serial No. 777,552
In the Netherlands November 22, 1946

1 Claim. (Cl. 40—152)

This invention relates to a frame for a painting, etching, drawing, water-colour, photograph or other essentially flat picture.

It is general practice in museums, art galleries and private houses to give to the pictures on the walls a forwardly inclined position. The reason is that in such a position of the picture the fall of the light is generally more favorable and less trouble is experienced from shining of the canvas of reflection of the glass, e. g. with a photograph or a water-colour. This usual method however has several disadvantages. In the first place it gives the visitor an unquiet and sometimes even disturbing impression when the frames with paintings, etchings, drawings, water-colours, photographs or other essentially flat pictures in a certain room or gallery are all hanging with a forward dip, often to different degrees. In the second place when moving a picture or when a picture has been taken down and has to be fixed to the wall again, one has to check each time whether it has again its most favorable inclination.

These drawbacks are overcome by the invention.

The object of the invention is to provide a frame for a painting, etching, drawing, water-colour, photograph or other essentially flat picture provided with means for holding the picture in a forwardly inclined position with respect to said frame.

This ensures that a painting, etching, drawing, water-colour, photograph or other essentially flat picture which is correctly mounted in the frame, has already a certain desired dip in forward direction even if the position of the frame itself is strictly vertical. Therefore it is no longer necessary to give the frame itself a forward inclination, and the frame can be mounted flat against the wall or at least parallel thereto. The unwelcome view of frames with varying inclinations is thereby eliminated. Moreover the angle of inclination or dip of the picture is determined by the construction or adjustment of the frame itself; thus it will not be necessary to check this angle each time anew when the picture is moved to another location. As a matter of fact when the frame is put vertically against the wall or parallel to it, the angle of inclination of the picture will automatically have the correct value.

Other objects and advantages of this invention will appear from the appended claim and from the following description read in connection with the accompanying drawings in which:

Figure 1:
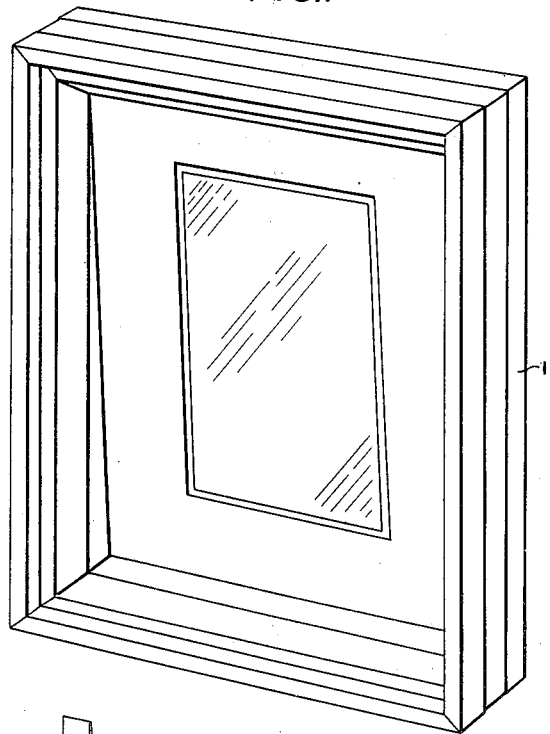
Figure 1 is a perspective view of a first embodiment of the invention.

In the drawing the reference 1 denotes a frame containing a water-colour or other picture 2, together with a glass sheet 3, of which the front rests as usual along its four sides against a rim 4. The back of the water-colour is protected by a sheet of cardboard 5. The distance between the rim and the back of the frame is greater at the top of the frame than at the bottom with the result that the front of the picture makes a certain angle with the rear of the frame. The picture therefore has a certain forward dip when the frame is placed flat against the wall. It appears from the sectional view in Figure 2 that top part and the bottom part of the frame have not the same cross-section because at the bottom part the rim 4 lies more backwards. Each of these parts however has the same cross-section along its entire length, which is not the case for the side parts. These have a cross-section which changes gradually from the top to the bottom because each time the rim lies more backwards.

Figure 3:
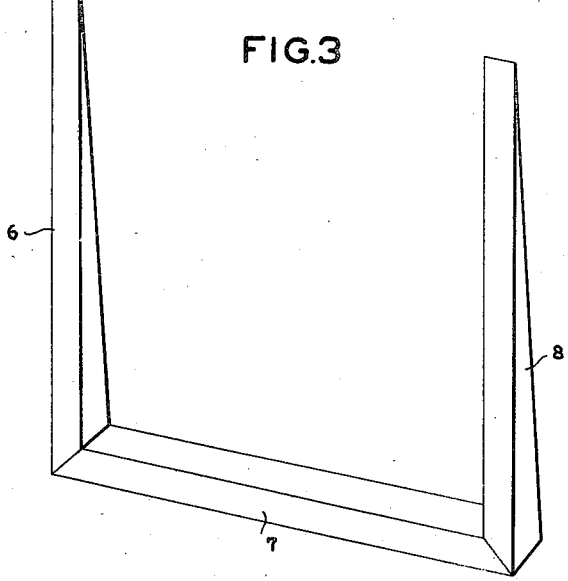
Figure 3 shows a set of filling pieces which may be used for transforming a normal frame into a frame according to the invention.
Figure 4:
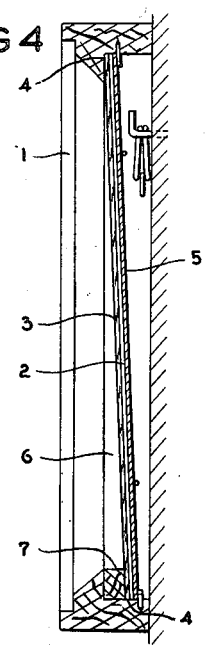
Figure 4 is a vertical cross-section of a frame in which the set of filling pieces shown in Figure 3 is used.

Such a sloping rim can also be obtained by means of filling pieces 6, 7 and 8 according to Figure 3, which can be placed in a frame with a normal rim, provided that this frame has a sufficient depth. The rectangular filling piece 7 is placed between the original rim and the lower edge of the glass, which with its upper edge will rest against the original rim. The triangular filling pieces 6 and 8 then fill the room which is left between the original rim and the side edges of the glass. As shown in Figure 3 the filling pieces 6, 7 and 8 can be assembled to form a quadrangle which is open at one side. It is also possible however to use separate filling pieces which can be fixed separately into the original frame, e. g. by means of glue.

There can also be a fourth filling piece which unites the triangular filling pieces at the top to form a closed quadrangle. The fourth piece must be considerably less in depth than the rectangular filling piece 7.

Figure 2:
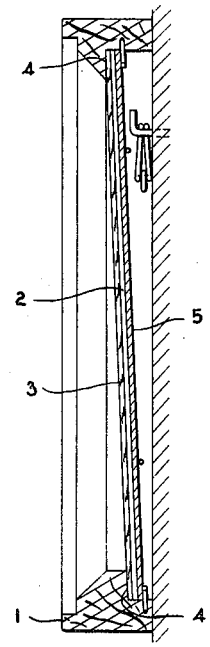
Figure 2 is a vertical cross-section of the frame in Figure 1.
Figure 5:
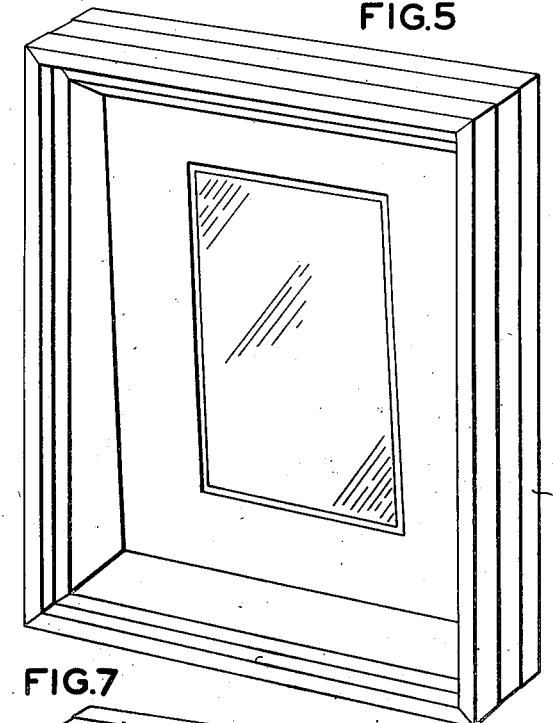
Figure 5 shows a perspective view of another embodiment of the invention.
Figure 6:
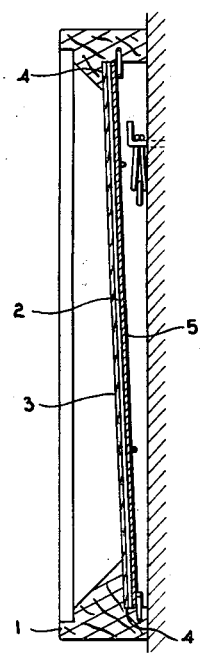
Figure 6 is a vertical section of the embodiment of Figure 5.

The embodiment of Figures 5 and 6 differs from that of Figures 1 and 2 in that the inner faces of the frame extend without a break onto the surface of the glass or of the picture when no protecting glass is used. In order to ensure that the exposed width of the picture is the same at the bottom as at the top, the inner faces of the side parts of the frame have to take a twisted form, i. e. the angle under which they reach the picture has to be steeper at the bottom than at the top. Such side parts are not so easy to make, but their effect is often more pleasing.

Figure 7:
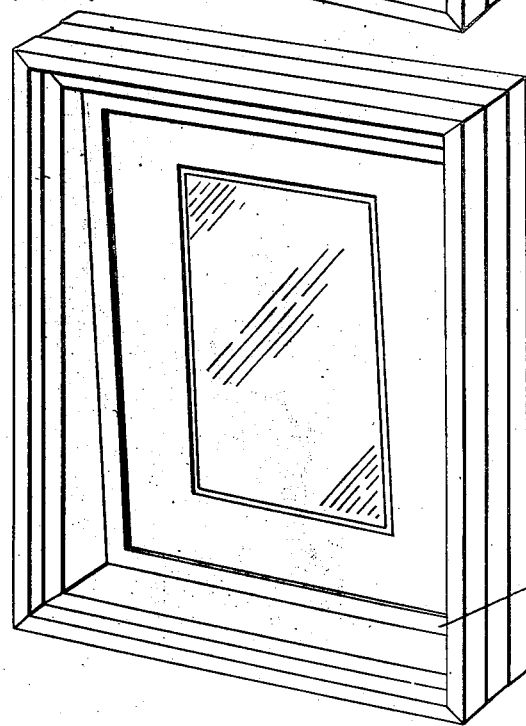
Figure 7 is a perspective view of still another embodiment.
Figure 8:
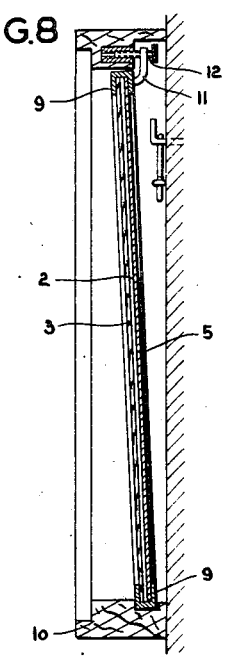
Figure 8 is a vertical section of the embodiment of Figure 7.

In Figures 7 and 8 is shown how the frame may consist of two parts; an inner part 9 which holds the picture 2 and an outer part 10 in which the inner part can be adjusted by means of a mechanism, which may consist of a nut 11 engaging a threaded rod 12. By rotation of the rod the nut 11 can be shifted and thereby the dip of the picture be adjusted to the desired value.

What the value of the dip for a given picture will be, depends for a large part on aesthetical considerations. Therefore it is not possible to give precise indications on this point here. It may be stated however that experiments with a number of painting and other pictures have shown that a forward dip of about 1:12 is a favorable value. These experiments have also shown that a frame according to the invention enhances the "depth" of a picture to a higher degree than does a normal frame. In order to obtain a good "depth" one has often used frames of relatively large width. When using the invention however, the same "depth" can be obtained with a considerably narrower and therefore less expensive frame.

Finally it can be stated that for the frame according to the invention any desired shape may be adopted.

What I claim is:

A picture frame of the class described comprising a frame of appreciably greater depth than the ordinary picture frame and of a constant depth around its perimeter, and abutment members positioned wholly within the confines of the frame whereby to position said picture at an angle to the frame and wholly within the confines thereof, said abutment members comprising triangularly shaped filling pieces, there being at least two of said pieces, one each abutting the inner surface of the vertical sides of the frame and of increasing thickness in depth from top to bottom of said pieces and frame.

FRANS DIEKMANN.

REFERENCES CITED

The following references are of record in the file of this patent:

UNITED STATES PATENTS

| Number | Name | Date |
| --- | --- | --- |
| 59,719 | Holmes | Nov. 13, 1886 |
| 752,283 | Cohn | Feb. 16, 1904 |
| 796,838 | Fraser | Aug. 8, 1905 |
| 1,104,219 | Polverino | July 21, 1914 |
| 2,220,262 | Miller | Nov. 5, 1940 |